April 6, 1954 | A. SPIELBERG | 2,674,727

PARITY GENERATOR

Filed Oct. 14, 1952 | 2 Sheets-Sheet 1

INVENTOR.
Arnold M. Spielberg

BY Morris [signature]

ATTORNEY

April 6, 1954

A. SPIELBERG 2,674,727

PARITY GENERATOR

Filed Oct. 14, 1952

2 Sheets-Sheet 2

INVENTOR.

Arnold M. Spielberg

BY Morris A. Rabin

ATTORNEY

Patented Apr. 6, 1954

2,674,727

UNITED STATES PATENT OFFICE 2,674,727

PARITY GENERATOR

Arnold Spielberg, Camden, N. J., assignor to Radio Corporation of America, a corporation of Delaware Application October 14, 1952, Serial No. 314,626

8 Claims. (Cl. 340—149)

This invention relates to electronic code error checking apparatus and more particularly is an improvement in apparatus for generating signals to supplement code signals whereby an error in code may be checked.

In the solution of a problem using digital computing apparatus usually a number of operations involving a large amount of coded information is performed in order to obtain a result. Of course it is desirable to have an accurate result and also to, if possible, catch any error while the computing apparatus is functioning on a problem. Thereby subsequent time is saved wherein the machine would have continued operating to an erroneous answer. Also, the point at which an error occurs also permits location of the faulty functioning equipment.

Thus it is very desirable to provide some means of detecting errors at the time the error is made. Many of the errors that are made occur in the transfer of information from one piece of equipment in a machine to another. Fortunately, this type of error is easiest to detect. Errors made in arithmetic operations appear to be relatively infrequent and are more difficult to detect. The reading or writing of information on magnetic tape, or on magnetic drums, and in high speed storage units are responsible for the majority of errors occurring in a machine. These errors are caused by such things as poor signals in the medium itself, amplifier troubles, faulty gate tubes and diodes, and power transients, to name a few.

A large percentage of these errors, which occur in the transfer of information around in a machine, can be detected at the time they occur by introducing a certain amount of redundancy into the information itself. By introducing sufficient redundancy it is possible to both detect and correct these errors. Simple error detecting codes such as the two out of five and three out of seven codes used in control switching systems or radio telegraphy are examples of the use of redundancy to detect errors. The two out of five system has been used by Bell Telephone Laboratories in some of their relay computers. A complete description of the two out of five system may be found in the publication by Alt, "A Bell Telephone Laboratories Computing Machine," "Mathematical Tables and Other Aids to Computing," volume 3, January and April 1948. The three out of seven system has been used by Bell Telephone laboratories in the Indicating Message Accounting Systems and is described in this same publication.

Still another form of redundant code for simple error detection is disclosed by R. W. Hamming in an article entitled "Error Detecting and Error Correcting Codes" in the Bell System Technical Journal, volume 29, April 1950. In this code a single binary digit is added to a binary number such that the number of ones in every binary representation is always odd or always even as desired. This system of checking is called a parity check. Hamming expands the simple single error detecting parity check to provide multiple error detecting and correcting codes by using a multiple parity over selected information positions. This of course, requires additional binary digits and decreases the redundancy.

A parity check is particularly well adopted to a binary coded decimal representation. The binary coded decimal representation is based upon the well known binary system which encodes numbers to the base 10 by breaking the numbers down to their component powers of two. In the binary coded decimal representation the first four binary digits are the same as in the binary system namely, $2^0$ to $2^3$ inclusive, to represent the digits zero through nine in the decimal system by ten of the sixteen possible characters formed by these four binary digits. In this manner, a number, to the base 10, having several decimal digits, for example, units, tens, and hundreds, is encoded in the binary coded decimal system by representing each decimal digit separately by these four binary digits. A fifth binary digit may be used as a parity check position. Either a zero or a one may be inserted in this position to make the total number of ones equal an even number if an even parity is desired, or equal an odd number if an odd parity is desired.

This code can be expanded to represent decimal digits, letters of the alphabet, and up to 28 special characters, such as punctuation marks, by using six binary digits in each character thereby providing 64 possible characters. The addition of a seventh binary digit to each character would provide a parity check with a redundancy of only 7/6. This set type of code is generally termed an alpha-numeric code. Six of these seven digits are required to unilaterally specify any of the 64 possible combinations allowed in the alpha-numeric code. The seventh digit is inserted to make the sum of all the one binary digits odd for an odd parity check. For example, the decimal number 6 may be expanded in an alpha-numeric code as 1000110. There are only two binary digits required to generate a decimal number 6 and the sum of these two digits will be even. Thus it is necessary to insert a third digit in the first or parity pulse position to make the total sum odd for the odd parity check used. Of course, an even parity may be used if desired. However, for the purposes of illustration, in the description of this invention, an odd parity check will be employed.

In adding or subtracting operations in a binary coded decimal system only the last four digits out of the seven digit code are required. The digits in the code are hereinafter referred to as "bits." Consequently, when two coded digits are fed into the arithmetic unit of a computer the resulting sum no longer has a parity pulse associated with it nor is it necessarily in binary coded form. Accordingly it becomes necessary to convert the sum from a pure binary form to a binary coded decimal form, and it is also necessary to regenerate the parity bit and attach it to the code form before sending it to a storage or further operational unit.

Some of the parity generating systems utilized heretofore have required a staticizing or storage unit in which to store each character while the determination of the need for a parity bit is being made. Other systems have required a means to serialize the binary bits composing a number in order to count them to obtain an indication as to whether the number of bits is odd or even.

An object of this invention is to provide a novel parity generator that can operate at a high rate of speed without any need for staticizing the binary sum while determining the parity.

A purpose of this invention is to provide a novel parity generator that can determine the requirement for a parity digit directly from the parallel code representation of a number.

Another object of this invention is to provide a relatively inexpensive and efficient parity generator whose construction, operation and maintenance is relatively simple.

Another purpose of this invention is to provide a novel parity generator that will generate an incorrect parity bit for a code representation of a number when the code representation of that number is too high.

These and further objects of this invention are achieved by providing a gating arrangement for generating a correct parity pulse output when the input number is between zero and nine and an incorrect parity pulse output when the input number is between 10 and 15. For the purpose of a parity check of a parallel code the code is applied in parallel to the inputs of a parity generator. Thereby phase and paraphase voltages are generated in response to an input pulse representing the binary one. These voltages are connected, by means of a distribution network, to several gating circuits in such a manner that when the number of "one" bits in the input code up to decimal 9 is even, an output pulse from the unit will be generated. If the number is odd no pulse will result. When an output pulse is generated another gate is opened and it generates a pulse which is added to the code representation of the number which was applied to the inputs as a parity pulse.

Further objects of this invention as well as a better understanding thereof, may be had from the following description when considered in conjunction with the accompanying drawings in which.

Figure 1:
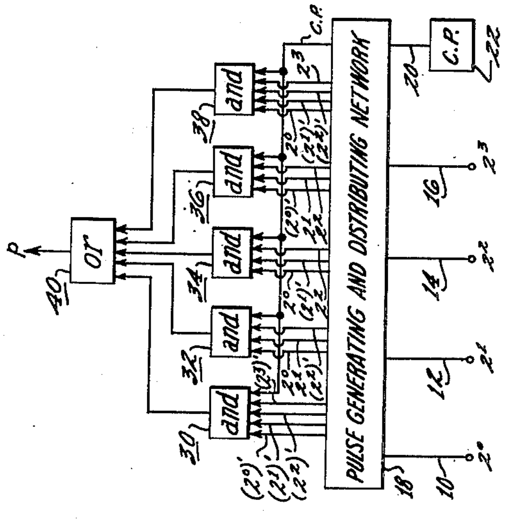
Fig. 1 is a block diagram of a system for generating a correct parity pulse in accordance with this invention.

In Fig. 1 a block diagram of a parity generator in accordance with one embodiment of this invention is shown. Inputs 10, 12, 14, and 16 are provided to a pulse generating and distribution network 18 each of which inputs corresponds to binary bits $2^0$ through $2^3$ inclusive. These bits are the binary coded sum representation obtained as the result of the addition of the numbers, omitting the carry. Thus it may be seen that the numbers that can be inserted into this parity generator lie in the range of zero to fifteen although, as will subsequently be shown, a correct parity is generated only for numbers from zero through nine. A pulse on any of the inputs represents the presence of that particular bit. The pulse generating and distributing network 18, which is shown and described in detail with reference to Fig. 2, receives the input pulses from the inputs. For each separate input pulse received two pulses are generated, one positive and one negative. The negative pulse, is termed an inhibit pulse. Another input 20 is provided for the pulse generating and distributing network 18 from a clock pulse generating source 22. A single positive pulse is generated responsive to this clock pulse input. These pulses are selectively connected to a plurality of "and" gates 30, 32, 34, 36, and 38.

The corresponding positive pulses generated for each of the input bits are indicated in Fig. 1 on the output of the pulse generating and distribution network 18 and are represented by the binary number symbol for the order of the particular bit. For example, the positive pulse output for a $2^0$ bit input is $2^0$ and so on. The inhibit or negative pulse output corresponding to each input bit is represented by the corresponding power of two designation enclosed by a parenthesis and having a prime mark. For example, the inhibit output for the $2^0$ input is represented by $(2^0)'$. The ouput of each "and" gate in turn is connected to the input of "or" gate 40. The output of "or" gate 40 is the signal output channel on which the parity pulse P appears.

The first four bits of a sum in a binary coded decimal code are fed to the inputs 10 through 16 inclusive, of the parity generator. For each pulse on one of these input lines positive and inhibit pulses are generated and distributed to the several "and" gates. When a positive clock pulse is applied to each of the "and" gates, if the conditions are proper, one or more "and" gates will open and pass an output pulse to "or" gate 40. "Or" gate 40 will then pass an output parity pulse.

For the gating system shown in Fig. 1 an output pulse will be produced whenever the number of input ones is even. Therefore, if an odd parity is used, this output pulse may be used directly as a parity pulse and added to the code sequence in the parity pulse position to yield the odd parity. If, however, an even parity is desired, this output pulse, which is produced upon the occurrence of an even number of ones, may be used to prevent the addition of a parity pulse to the code sequence. For example, a clock pulse could be used to add a parity pulse to each code sequence as it is placed in the parity generator. An output pulse from the generator could be used to prevent the application of this clock pulse to the code sequence thereby producing an even parity.

Considering now the various gating circuits in detail, "and" gate 30 is connected to receive inhibit inputs when the $2^0$, $2^1$, $2^2$, and $2^3$ inputs are energized. A positive or normal input to this "and" gate is provided from the clock pulse input. An "and" gate may be defined as a logical gating system having a plurality of input terminals and a single output terminal. The function of the "and" gate, sometimes called a "coincidence gate," is to pass an impulse only when all of the inputs are energized simultaneously. The term "coincidence gate" follows logically since the "and" gate functions to produce an output only on the coincidence of all input signals. An "and" gate having both normal and inhibit inputs functions to produce an output signal if the normal input signal is present and none of the inhibit signals are present. Thus "and" gate 30, which has both inhibit signals and a normal signal as its input, will produce an output signal upon receipt of a signal from the clock pulse source. If any of the inhibit signals are present, the "and" gate will not produce an output signal.

In a similar manner "and" gate 32 is connected to receive a normal signal from the clock pulse source and when the $2^0$ and $2^1$ inputs to the parity generator are energized and an inhibit signal when the $2^2$ input is energized. Following the principles previously set forth for the operation of an "and" gate, "and" gate 32 will produce an output on the simultaneous receipt of pulses from the $2^0$, $2^1$ inputs, and the clock pulse source providing no inhibit signal is present due to the $2^2$ input being energized.

"And" gate 34 is connected to receive normal signals from the $2^0$, $2^2$, and clock pulse inputs, and an inhibit signal from the $2^1$ input. An output will be produced from this "and" gate on the simultaneous receipt of pulses from the $2^0$, $2^2$ and clock pulse inputs in the absence of an inhibit signal from the $2^1$ input. Following these same operational principles, "and" gate 36 will produce an output when the $2^1$, $2^2$ and clock pulse are energized providing the $2^0$ input is not. "And" gate 38, on the other hand, will produce an output on the simultaneous application of pulses resulting from the $2^0$, $2^3$, and clock pulse inputs being energized, providing the $2^1$ and $2^2$ inputs are not energized.

As was mentioned above, the outputs of "and" gates 30 to 38 inclusive, are connected to the inputs of an "or" gate 40. "Or" gate 40 provides parity pulse output. An "or" gate is a logical gating arrangement having two or more inputs and a signal output. Pulses are applied to one or more of these inputs. The operation of the "or" gate is such to produce an output pulse if a pulse is applied to any one or all of the inputs.

Considering as an illustrative example, that the number 5 in binary form had just resulted from an addition operation. This number 5 must now be inserted into the parity generator to generate a parity pulse if needed. Considering that the four bit binary representation of 5 is 0101 it is apparent immediately that the number of ones present is two, an even number. Consequently in an odd parity system an additional pulse must be generated. For an even parity a pulse would also be generated to prevent the addition of a parity pulse. This number 5 when inserted into the parity generator contains pulses on the $2^0$ and $2^2$ inputs (10 and 14). For each of these input pulses both positive and negative (phase and paraphase) or normal and inhibit voltages are generated. Through the distribution network 18 these positive and negative pulses are transmitted to certain of the "and" gates. "And" gate 30 will receive inhibit signals from both of these two inputs and consequently no output will be produced when the clock pulse is received. In "and" gate 32 a positive pulse from the $2^0$ input and an inhibit pulse from the $2^2$ input along with the clock pulse will be received. Accordingly, since only two of the required three normal signals are present along with an inhibit signal, "and" gate 32 will not produce any output. All of the normal inputs to "and" gate 34 namely $2^0$, $2^2$, and the clock pulse input are energized. Since no inhibit pulse is applied to the $2^1$ input, "and" gate 34 will produce an output signal.

The operation of "and" gate 36 is similar to that of "and" gate 32. Since only two of the three normal inputs namely, the clock pulse input and that from the $2^2$ input is present, no output will be produced. A similar result occurs in "and" gate 38 since an input from the $2^3$ input is required and none is received. "Or" gate 40 will consequently receive a single input pulse from "and" gate 34. This single pulse is sufficient to cause "or" gate 40 to produce an output and there by a parity pulse which is the correct operation for the number 5 when an odd parity is desired.

Assume now that due to some error in a previous binary to binary coded decimal conversion instead of the number 5 being applied to the parity generator input, that an additional pulse appears in the $2^3$ input. With this set of conditions the binary number represented is 13. This parity generator generates an incorrect parity pulse and thus enables subsequent detection of this error. Since the binary representation of the number 13 contains three ones, which is odd, a parity pulse must be generated to give the incorrect parity. The $2^3$ input, however, will cause no different parity generator operation than that resulting from the application of the $2^0$ and $2^1$ which represents 5. The additional input to "and" gate 30 due to the $2^3$ input is an inhibit signal and will not produce any output. There are no additional inputs to "and" gates 32, 34, 36, consequently, the operation will be the same as that described above. Accordingly "and" gate 34 produces an output. "And" gate 38 will receive the additional input from the $2^3$ input necessary to produce an output. However, since an inhibit input is also present, from the $2^2$ input, "and" gate 38 will be prevented from producing an output. Consequently, "or" gate 40 receives an input from "and" gate 34 and will produce an output pulse. This added to the three ones of the number 13 produces an even number of ones and accordingly is an incorrect parity. This generator will produce an incorrect parity pulse for every number over 9.

Figure 2:
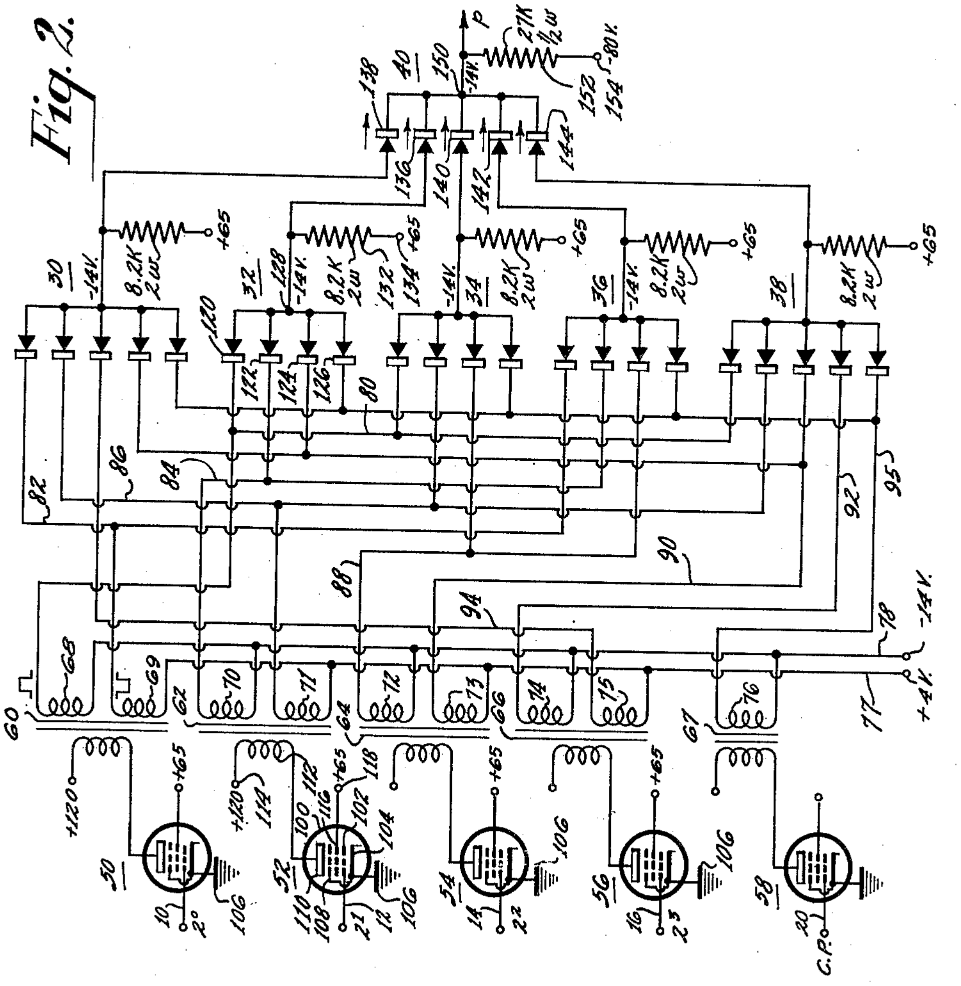
Fig. 2 is a circuit diagram of the embodiment of the invention shown in Fig. 1 in accordance with this invention.

Fig. 2 shows the circuit details of an embodiment of this invention using unilaterally conducting crystal diodes adapted to perform the operations indicated in Fig. 1. The diodes may be any body or combination of materials having suitable properties of unilateral conduction i. e. Galena crystal, copper oxide, rectifier or Germanium crystal diodes one type of which is commercially identified as type 1N34. The inputs $2^0$ to $2^3$ inclusive, and the clock pulse input 20 are connected to the inputs of amplifiers 50, 52, 54, 56, and 58. The output of each amplifier is in turn connected to transformers 60, 62, 64, 66, and 67 respectively.

Each of the transformers has two secondary windings 68, 69, 70, 71, 72, 73, 74, 75, except the clock pulse transformer 67 which has only one secondary winding 76. The two secondary windings for each transformer are wound to oppose each other. One of the halves of each secondary winding 69, 71, 73, 75 is connected at one end to a +4 volt potential line 77. Likewise, the other half of each secondary winding 68, 70, 72, and 74, along with secondary winding 76, are connected at one end to a −14 volt potential line 78. The remaining ends from each of the secondary windings are each connected to distribution lines. Thus the remaining end of secondary winding 68 is connected to distribution line 80, the remaining end of secondary winding 69 is connected to distribution line 82, the remaining end of secondary winding 70 is connected to distribution line 84, the remaining end of secondary winding 71 is connected to distribution line 86, the remaining end of secondary winding 72 is connected to distribution line 88, the remaining end of secondary winding 73 is connected to distribution line 90, the remaining end of secondary winding 74 is connected to distribution line 92, and the remaining end of secondary winding 75 is connected to distribution line 94. The remaining end of secondary winding 76 is connected to distribution line 95. These distribution lines connect the several secondary windings of various ones of the inputs to the "and" gates 30, 32, 34, 36, and 38. Since the operation of each of the input amplifiers is similar only the operation for the $2^1$ input and that for "and" gate 34 will be described in detail.

For the $2^1$ input to the generator the amplifier 52 includes an amplifier tube 100 having a plate, grid and cathode. The tube shown is a pentode, but a triode or other tube type may be used. The $2^1$ input to the parity generator is connected to the grid 102 of the amplifier tube 100. The cathode 104 is connected to ground terminal 106 and to the suppressor grid 108. The plate 110 is connected through primary winding 112 of transformer 62 to a source of B+ voltage. The screen grid 116 is connected to a source of positive voltage. The winding polarity of the two secondary windings 70 and 71 of the transformer is such that for any input pulse applied to the primary winding the resulting pulses in the two secondary windings are of opposite polarity to each other. Accordingly, for a positive input pulse from the $2^1$ input secondary winding 70 provides a positive pulse and secondary winding 71 provides a negative pulse.

In a like manner the remaining parity generator inputs are each connected to amplifiers having transformer outputs to generate positive and negative output pulses. Likewise, each of the transformer outputs for each input to the parity generator is connected to its respective distribution lines.

Considering now the structure of "and" gate 32 as an illustrative case, four diodes 120, 122, 124, and 126 are provided. The cathode of diode 120 is connected to distribution line 80 and thus to the secondary winding 68 of transformer 60. Secondary winding 68 provides a positive pulse from the $2^0$ input when energized. Since secondary winding 68 is returned to the −14 volt potential line 78, the cathode of diode 120 is also connected to this −14 volt potential. The anode of the diode is connected to a common point 128. The anodes of the remaining diodes 122, 124, and 126 are each also connected to this same common point 128. The cathode of diode 122 is connected to distribution line 84 and thus to the secondary winding 70 of transformer 62. Secondary winding 70 is the positive pulse output of the $2^1$ input. Here also secondary winding 70 is returned to the −14 volt potential line 78 which effectively connects the cathode of diode 122 to this same source.

The cathode of diode 124 is connected to distribution line 90 and thus to the secondary winding 73 of transformer 64. Secondary winding 73 provides a negative pulse from the $2^2$ input when energized. Since secondary winding 73 is returned to the +4 volt potential line 77 the cathode of diode 124 is connected to this same source. In a similar manner the cathode of diode 126 is connected to the clock pulse distribution line 95 and thus to secondary winding 76 of transformer 67. Secondary winding 76 is a source of a positive pulse from the clock pulse input. Since secondary winding 76 is returned to the −14 volt potential line 78 the cathode of diode 126 is connected to this same source. Common point 128 is connected (1) through a resistance 132 to a source of +65 volt potential 134, and (2) to the anode of a diode 136. Diode 136 is one of the input diodes of "or" gate 40.

The remaining input diodes 138, 140, 142, and 144 of "or" gate 40, each have their anodes connected to the output of "and" gates 30, 34, 36, and 38 respectively. The cathodes of all of the diodes in "or" gate 40 are connected to a junction point 150. Junction point 150 is connected through a resistance 152 to a source of −80 volt potential 154. The parity pulse output is obtained from junction point 150.

In the quiescent condition of "and" gate 32 diodes 120, 122, and 126 are conducting by virtue of having their cathodes connected through their respective transformer secondaries 68 and 70 to the −14 volt potential line 78, and their anodes through resistance 132 to the +65 volt potential source 134. Since the diodes in their conducting state have a negligible impedance and since the secondary windings of the input transformer are of low impedance, common point 128 assumes substantially a −14 volt potential.

These connections effectively clamp common point 128 to the −14 volt potential. Since the cathode of the "or" gate input diode 126 is connected through resistance 152 to the −80 volt source 154 and its anode to common point 128 which is clamped at −14 volts, the diode will conduct. Conduction in diode 136 maintains junction point 150 at the same potential as common point 128, namely −14 volts. Since at least one diode in each of the remaining "and" gates is returned to the −14 volt potential line 78, the output of each of the "and" gates will be at −14 volts and all of the input diodes of "or" gate 40 will be conducting.

The operation of "and" gate 32 may best be understood by assuming several hypothetical inputs. Assuming that the $2^0$ input is energized, the secondary windings 68 and 69 in the output of amplifier 50 will produce a positive output pulse on distribution line 80 and a negative output pulse on distribution line 82. The positive pulse on distribution line 80 is applied to the cathode of diode 120 and is of sufficient amplitude to block conduction therein. This will have no effect upon the voltage at common point 128 since diode 122 and the clock pulse diode 126 remain connected to the —14 volt source and maintains the common point clamped at the —14 volts. However, if the clock pulse input and $2^1$ input both receive pulses, the secondary windings 76 and 70 in the outputs of amplifiers 58 and 52 respectively, will produce positive pulses. These positive pulses are transmitted by way of distribution lines 95 and 84 to the cathodes of diode 126 and 122. Conduction through these diodes is now blocked as is conduction through diode 120. At this time the voltage in common point 128 being connected to the +65 volt potential source 134 will begin to rise. The rise in voltage will continue up to +4 volts at which point diode 124 will conduct and clamp common point 128 at this voltage. Clamping occurs since the cathode of diode 124 is returned to the +4 volt potential line 77. The rise in voltage at common point 128 is transmitted through input diode 136 of "or" gate 40. This voltage pulse then appears across resistance 152 to produce an output parity pulse.

If in addition to the $2^0$ and $2^1$ inputs being energized, the $2^2$ input is also energized, a different result will occur. A pulse on the $2^2$ input will produce positive and negative pulses in the output secondary windings 72 and 73 respectively, of amplifier 54. These pulses are applied on distribution lines 88 and 90 respectively. The negative pulse on distribution line 90 is applied to the cathode of diode 124. The negative pulse will produce conduction through diode 124 and is of a sufficient negative amplitude to maintain common point 128 clamped at —14 volts. Under these conditions when the clock pulse is applied at diode 126 no output will result. This occurrence has been described previously for a negative inhibit signal and will prevent the operation of "and" gate 32.

The remainder of the "and" gates operate substantially in this same manner and require the simultaneous application of the positive produce pulses from the various inputs to each of their respective diodes plus a clock pulse input in order to produce an output. Any "and" gate not receiving all of its normal inputs will not produce an output. Further any "and" gate receiving a negative inhibit input is prevented from producing an output even though all normal inputs are present.

By way of summary, pulses representing a binary number to receive a parity pulse are applied to the $2^0$ to $2^3$ inputs inclusive, of the parity generator. These inputs are each connected to input amplifiers. Those input amplifiers which receive input pulses produce positive and negative pulses in the secondary winding outputs. Through the distribution lines 80 to 94 inclusive, these pulses are transmitted to certain of the gating circuits. Upon receipt of the proper pulses the gating circuits will produce an output parity pulse.

In order to describe a completely operative circuit the resistance values used in conjunction with the voltages set forth are: The output resistances for the "and" gates (132) are 8,200 ohms, and the output resistance 152 for the "or" gate 40 is 27,000 ohms. It is to be understood that these resistance and voltage values herein set forth are by way of illustration only and are not to be construed as a limitation, as other values may be used to meet the particular needs of the circuit.

With the circuit arrangement shown, the "or" gate diodes are conducting in their quiescent condition and an output voltage is obtained merely by placing a voltage impulse on either of the inputs to the "or" gate. The same amplitude voltage that is applied to the input is obtained at the output with no effective loss. This is a particular advantage over some prior art diode gating circuits which have an inherent loss in that the input signal is required to overcome the bias of these output diodes before any output can be produced. Further since the diodes in their present embodiment of the invention are conducting in the stand by period, the stray capacitance due to the wiring of the circuit is continually charged. There is, therefore, no loss of energy in a charging operation. This results in pulse outputs having a steep wave front.

Another advantage of applicant's circuit is that since the amplifier transformer source used has a low impedance "bumps" or spurious pulses produced in the output due to an input being applied only terminal of an "and" gate are minimized. This particular feature has been previously pointed out as resulting from the fact that an increase in clamping current producing a negligible voltage drop in the low impedance source for the diodes. The low impedance pulse source is attained by the use of step down transformers in the output of pentode tubes operated to give a low output impedance. By the elimination of this input voltage drop effective clamping of the common point is obtained.

Figure 3:
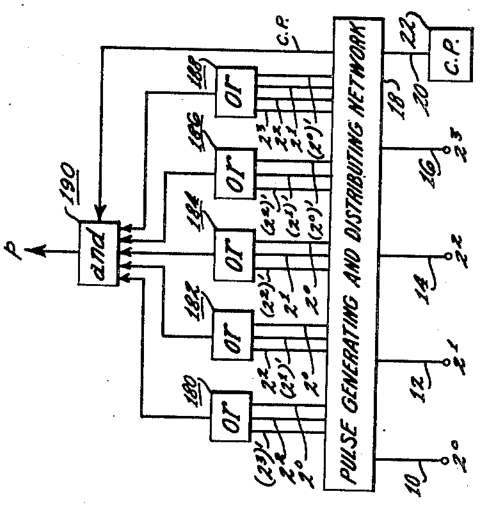
Fig. 3 is a block diagram of an arrangement of the gating circuits used to generate a parity pulse in accordance with a second embodiment of this invention.

Referring now to Fig. 3, there is shown a block diagram of an "or-and" arrangement of gates, which is an alternative embodiment of this invention useable for generating a parity pulse. Inputs 10, 12, 14, and 16 are provided, for each of the first four binary number representing bits $2^0$ through $2^3$ inclusive, to the parity generator. These inputs along with an input 20 from clock pulse source 22 are connected to a pulse generating and distribution network 18 in the same manner as described with reference to Fig. 1. The outputs of the pulse generating and distributing network 18, exclusive of the clock pulse output are selectively connected to a plurality of "or" gates 180, 182, 184, 186, and 188.

The pulses generated for each of the binary bit inputs are indicated in Fig. 3 on the outputs of the pulse generating and distributing network 18 by the actual number symbols that they represent. This symbolism is the same as that used in Fig. 1. The output of each "or" gate is connected to the input of "and" gate 190 as is the clock pulse output from the pulse generating and distributing network 18. "And" gate 190 comprises the signal output channel on which the parity pulse P appears.

Considering now the various gating circuits in detail, "or" gate 180 is connected to receive an inhibit signal from the $2^3$ input and normal signals from the $2^2$ and $2^0$ inputs. Although an "or" gate, sometimes called a buffer gate, operates to produce an output pulse upon a pulse being applied to any of its normal inputs when the "or" gate has an inhibit input it operates to produce a continuous output signal even though no inputs are present. An "or" gate having several inhibit inputs will also continue to produce an output signal as long as at least one of these inputs does not receive the inhibit pulse. If the "or" gate has an output signal the "or" gate is said to be "high," if there is none, the gate is said to be "low."

If all the inhibit inputs are energized, the "or" gate will be cut off and will produce no output signal. Thus "or" gate 180 will produce an output signal and be "high" if either the $2^0$ or $2^2$ inputs are energized regardless of the condition of the $2^3$ input. However, if neither the $2^0$ nor $2^2$ inputs are energized and the $2^3$ input receives an inhibit pulse "or" gate 180 will be "low." Of course, while no pulses are applied "or" gate 180 is "high."

"Or" gate 182 is connected to receive normal inputs from the $2^0$ and $2^2$ inputs and an inhibit input from the $2^1$ input. Since "or" gate 182 is connected to receive an inhibit input, the "or" gate will be "high" if no inputs whatsoever are present. If the inhibit input from the $2^1$ input is received the "or" gate will be cut off or "low." However, if in addition to this signal received from the $2^1$ inhibit input, either the $2^0$ or $2^2$ inputs are energized, "or" gate 182 will again produce an output and be "high."

"Or" gate 184 is connected to receive an inhibit signal from the $2^2$ input or normal signals from the $2^0$ or $2^1$ inputs. "Or" gate 186 is connected to receive inhibit signals from the $2^0$, $2^1$, and $2^2$ inputs. This "or" gate will consequently be "high" and produce an output unless inhibit signals are received on all of the inputs. "Or" gate 188 is connected to receive an inhibit signal from the $2^0$ input and normal signals from the $2^1$, $2^2$ and $2^3$ inputs. Again the operation of this "or" gate is similar to those previously described. The "or" gate will produce no output if the $2^0$ input alone is energized, but will produce an output if any of the $2^1$, $2^2$, and $2^3$ inputs are energized.

The outputs of the four "or" gates 180 to 188 inclusive, along with the clock pulse input, are connected to the inputs of "and" gate 190 which will pass an impulse only when signals from all five "or" gates (the "or" gates being "high") plus a clock pulse are present.

The arrangement of these "or" and "and" gates is such as to provide an odd parity signal, as previously explained. Assume for illustrating the operation of the system that the number five or 0101 is applied thereto.

Accordingly, pulses are applied to the $2^0$ and $2^2$ inputs. For each of these input pulses, both positive and negative (phase and paraphase) voltages are generated. Through the pulse generating and distributing network 18 these positive or negative pulses are transmitted to certain of the "or" gates. "Or" gates 180 and 182 will receive normal signals from both of these two inputs and consequently an output will be produced or the "or" gates will remain "high." "Or" gate 184 will receive an inhibit pulse from the $2^2$ input and a normal pulse from the $2^0$ input. The inhibit pulse, which would normally cut off "or" gate 184, in this case is overridden by the $2^0$ normal input and the "or" gate will remain "high." "Or" gate 186 will receive two inhibit signals from these two inputs that are energized. In this case, however, since the $2^1$ input, which is inhibit input to the "or" gate, does not receive a pulse, "or" gate 186 will remain "high." In a similar manner the receipt of a positive signal from the $2^2$ input of "or" gate 188 will override the effect of a signal being present on the $2^0$ inhibit input. Consequently, "or" gate 188 will remain "high." Under these conditions, the output of all of the "or" gates remains "high" and "and" gate 190 will produce an output on the receipt of a pulse from the clock pulse source 22. The output of "and" gate 190 is the parity pulse which is a correct response for the number five to establish an odd parity.

Assuming now that in the binary to binary coded decimal conversion a mistake was made. For example, instead of the representation of five, as occurred above, an additional pulse was produced in the $2^3$ output. With this additional pulse, the binary represented number would be 13, which of course, is incorrect since the output of a binary to binary coded decimal converter should not be above nine. In accordance with the operation of this parity generator, an incorrect parity pulse should be generated in order that this error might later be detected.

The simplest method of accomplishing this result is to generate a pulse for an even number of ones for these numbers which are incorrect. Since the binary representation of the number 13 contains three ones, which is odd, a pulse must be generated to give the incorrect even parity. This additional pulse from the $2^3$ input will cause very little change in operation from that resulting from the binary represented five. For example, in "or" gate 180 the addition of an inhibit pulse from the $2^3$ input can not cause "or" gate 180 to be cut off since normal pulses are present on the remaining two inputs. The operation of "or" gates 182, 184, and 186 will obviously all be the same as described above, since no input from the $2^3$ input is present. In "or" gate 188 the operation again remains the same since the addition of a normal pulse from the $2^3$ input merely allows the "or" gate to remain "high" as it was previously. With all of the "or" gates "high" as before, "and" gate 190 will produce a pulse upon receipt of a clock pulse. This pulse, now combined with the three binary "ones" yields an even parity which is incorrect with the odd parity convention being used here. Similarly, if an even parity is desired, this output pulse will prevent the addition of a parity pulse as previously described. With no parity pulse the count remains odd which is incorrect parity.

Figure 4:
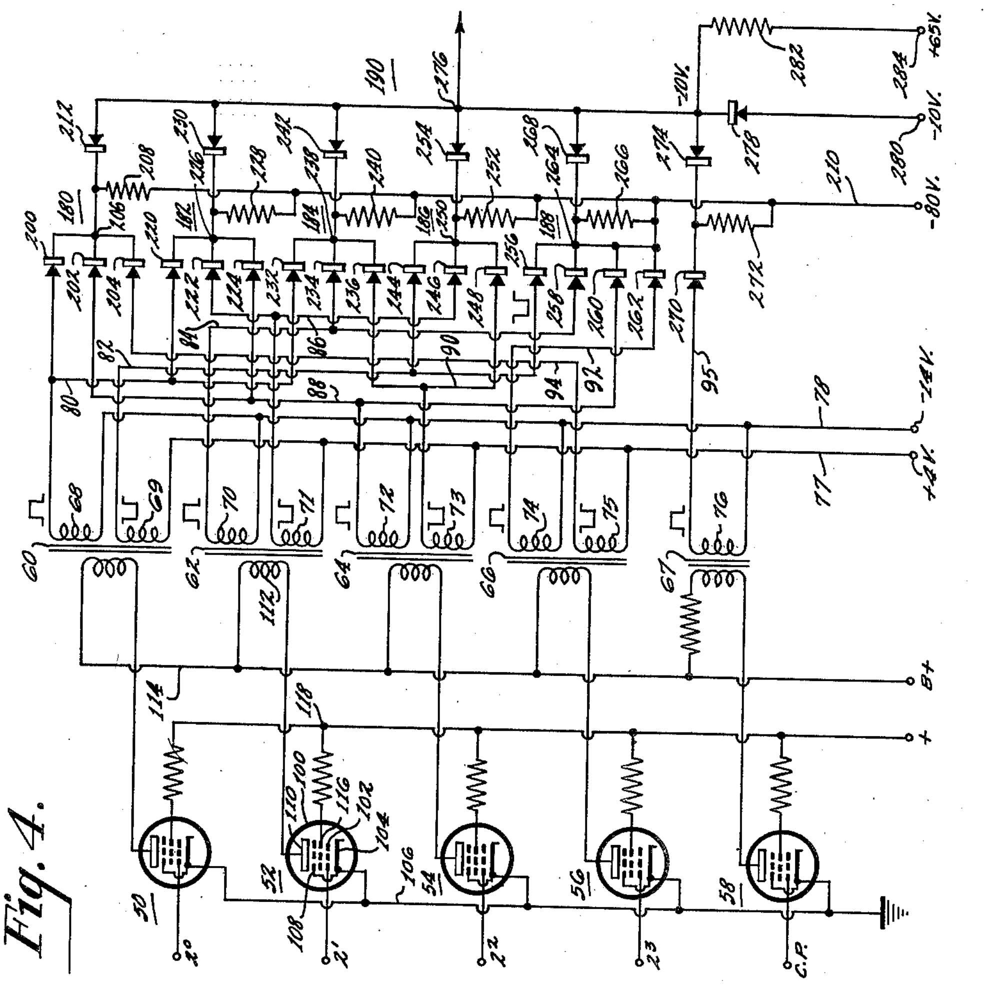
Fig. 4 is a circuit diagram of the second embodiment of the invention shown in Fig. 3 in accordance with this invention.

Fig. 4 shows the circuit details of the second embodiment of this invention employing unilaterally conducting crystal diodes of the type utilized in Fig. 2. The several circuit connections from the inputs through the amplifier, transformer and distribution network as well as the operation thereof is the same as that described in Fig. 2. Consequently, the same numeral designations have been used in Fig. 4.

From each of the distribution lines connections are made to certain of the "or" and "and" gates to carry out the operations indicated in Fig. 3. The first of the "or" gates 180 comprises three diodes 200, 202, and 204. The cathodes of all of the diodes are connected to a common point 206. The anode of diode 200 is connected to distribution line 80 and thus to the secondary winding 68 of transformer 60 which is the source of a positive pulse from the $2^0$ input when energized. Since secondary winding 68 is returned to the —14 volt potential line 78, the anode of diode 200 is returned to this same source. The anode of diode 202 is connected to distribution line 88 and thus to the secondary winding 72 of transformer 64 which is the positive pulse output for the $2^2$ input. Secondary winding 72 is returned to the —14 volt potential line 78 which effectively connects the anode of diode 202 to this same source.

The anode of diode 204 is connected to distribution line 94 and thus to the secondary winding 75 of transformer 66 which is the negative pulse output for the $2^3$ input. Secondary winding 75 is returned to the +4 volt potential line 77 which effectively connects the anode of diode 202, to this same source. Common point 206 is connected through a resistance 208 to a —80 potential line 210 and to the cathode of one of the input diodes 212 of "and" gate 190.

In a similar manner the anodes of the remaining diodes in the several "or" gates are each connected to certain of the distribution lines and thereby to the secondary output windings of the several transformers. Because of this connection through the secondaries of the transformers, the anodes of diodes are returned either to the +4 volt potential line 77 or the —14 volt potential line 78. Thus "or" gate 182 contains three diodes 220, 222, and 224. The cathodes of each of these diodes are connected to a common point 226. Common point 226 is connected through a resistance 228 to the —80 volt potential line 210 and to the cathode of one of the input diodes 230 of "and" gate 190. Further, the anode of diode 220 is connected to receive a positive pulse from secondary 68 when the $2^0$ input is energized and is returned via secondary 68 to the —14 volt potential line 78. In a similar manner, the anode of diode 222 is connected to receive a negative pulse when the $2^1$ input is energized and is returned via secondary 71 to the +4 volt potential line 77. The anode of diode 224 is connected to receive a positive pulse when the $2^2$ input is energized and is returned via secondary 72 to the —14 volt potential line 78.

"Or" gate 184 also contains three diodes 232, 234, and 236, the cathodes of which are connected to a common point 238. Common point 238 is connected through a resistance 240 to the —80 volt potential line 210 and to the cathode of an input diode 242 of "and" gate 190. The anode of "or" gate diode 232 is connected to receive a positive pulse when the $2^0$ input is energized and is returned via secondary 68 to the —14 volt potential line 78. In a similar manner, the anode of diode 234 is connected to receive a positive pulse when the $2^1$ input is energized and is returned to the —14 volt potential line 78 via secondary 70. Diode 236 is connected to receive a negative pulse when the $2^2$ input is energized and is returned to the —4 volt potential line 77 via secondary 73.

"Or" gate 186 contains three diodes 244, 246, and 248. The anodes of each of these diodes is connected to a common point 250 which in turn is connected through a resistance 252 to the —80 volt potential line 210 and to the cathode of an input diode 254 of "and" gate 190. In "or" gate 186 the anodes of each of the three diodes 244, 246, and 248 are each connected, respectively to secondaries 69, 71, 73, to receive negative pulses when the $2^0$, $2^1$, and $2^2$ inputs are energized respectively. The anode of each of the diodes is returned through their respective secondary output windings to the +4 volt potential line 77.

The "or" gate 188 differs slightly from those previously described in that it contains four diodes 256, 258, 260, and 262. The cathodes of each of these diodes is connected to a common point 264. Common point 264 is in turn connected through a resistance 266 to the —80 volt potential line 210 and to the cathode of an input diode 268 of "and" gate 190. The anodes of three of the diodes 258, 260, and 262 are connected to receive, respectively from secondaries 70, 72, 74, positive pulses from the $2^1$, $2^2$, and $2^3$ inputs respectively. Each of these anodes is also returned via the respective secondaries to the —14 volt potential line 78. The anode of the remaining diode 256 is connected to receive a negative from secondary 69 pulse when the $2^0$ input is energized and is returned to the +4 volt potential line 77.

Distribution line 95, which supplies the clock pulse, is connected to the anode of a buffer diode 270. The cathode of buffer diode 270 is connected through a resistance 272 to the —80 volt potential line 210 and to the cathode of an input diode 274 of "and" gate 190. The anode of diode 270, being connected to the secondary winding output of the clock pulse input is returned to the —14 volt potential line 78.

The "and" gate 190 contains six input diodes 212, 230, 242, 254, 268, and 274. The anode of each of these diodes is connected to a common junction point 276. Junction point 276 is connected to the cathode of a clamping diode 278. The anode of clamping diode 278 is connected to a —10 volt potential source 280. Junction point 276 is also connected through a resistance 282 to a +65 volt potential source 284. The parity pulse output is taken from across this latter resistance and is taken from junction point 276.

In the quiescent condition of this gating arrangement all of the "or" gate diodes which have their cathodes returned through their respective secondary winding pulse sources to the +4 volt potential line 77 are conducting. Thus "or" gate diodes 204, 222, 236, 244, 246, 248 and 256 are conducting. The cathodes of each of these diodes are connected to the —80 volt source 178 to complete the circuit. Since the diodes in their conductive state have negligible impedance and since the secondary windings of the input transformers are of low impedance, the common point outputs of each of the "or" gates assume substantially the potential of the +4 volt potential line 77.

The input diodes to the "and" gate have no tendency to conduct since their anodes are clamped to —10 volts by clamping diode 278. The action of the clamping diode overcomes any effect that the +65 volt source 284 may have upon the anodes. Consequently, the output of each of the "or" gates in quiescent condition is "high." Further, none of the "and" gate input diodes, with the exception of diode 274, are conducting. Diode 274 provides a return circuit for the clamping diode 278 to the —80 volt potential line 210 whereby the clamping action of the diode is effectuated.

It should be apparent, that in the quiescent condition, with all of the "or" gates "high" the receipt of a clock pulse will cause "and" gate 190 to produce an output. The clock pulse produces a positive pulse on the anode of buffer diode 270. This increases conduction through diode 270 and through resistance 272 thereby raising the voltage on the cathode of input diode 274. This increase in voltage prevents the flow of current through diode 274 thereby preventing clamping diode 278 from functioning. When this occurs the voltage at junction point 276 rises due to the +65 volt source 234 and an output parity pulse is obtained. This state of events is the functioning of the parity generator when the binary number inserted is a zero. Under these conditions none of the inputs would receive a pulse and the quiescent condition of "or" gates will control. It might further be stated that this is also the function of the "and" gate 190 under any other set of conditions under which a parity pulse should be generated. That is the output of all of the "or" gates must be "high." With the outputs "high" the application of a clock pulse will cause the "and" gate 190 to produce a parity pulse.

The operation of the various "or" and "and" gates may best be understood by assuming a hypothetical input. Assuming that the number applied is 5, which is the same number assumed for illustration of Fig. 3, the $2^0$ and $2^2$ inputs will receive a pulse. For each of these input pulses positive and negative pulses will be generated, by secondary windings 68, 69, 72, and 73. These pulses are transmitted through their respective distribution lines and will appear at the various "or" gates. Thus in "or" gate 180, diodes 200 and 202 receive positive pulses at their anodes. These pulses will have no effect upon this "or" gate since diode 204 was quiescently conducting and the output of the "or" gate was in a "high" condition.

In a similar manner, diodes 220 and 224 of "or" gate 182 will receive positive pulses on their anodes. Here again, since the remaining diode 222 of "or" gate 182 does not receive an inhibit pulse the output of this "or" gate, which was quiescently "high," remains "high." In "or" gate 184 diode 232 will receive a positive pulse from the $2^0$ input and diode 236 will receive an inhibit impulse from the $2^2$ input. On receipt of the inhibit impulse diode 236 will cease conduction and the output of "or" gate 184 at common point 238 will begin to fall. However, the simultaneous receipt of a positive pulse at diode 232 will cause conduction through this diode through resistance 240 to the −80 volt potential line 210. This condition will offset the voltage drop effected by diode 236 and the output of "or" gate 184 will again assume a "high" condition.

Diodes 244 and 248 of "or" gate 186 will receive inhibit impulses from the $2^0$ and $2^2$ inputs. The inhibit impulses will block conduction through these diodes. The output of "or" gate 186, however, remains "high" since the diode 246 is connected to an inhibit input and remains conducting thereby maintaining common point 250 in a "high" condition. In "or" gate 188 diode 256 will receive an inhibit pulse from the $2^0$ input and diode 260 will receive a normal pulse from the $2^2$ input. As in the previous case, diode 256 will be cut off, but since the first diode 260 receives a normal pulse the output of "or" gate 188 will remain "high."

Under these conditions it is seen that all of the inputs to "and" gate 190 with the exception of the clock pulse input are "high." Consequently, when a clock pulse is received and the clock pulse input to the "and" gate is caused to go "high," the "and" gate will produce an output parity pulse. This is the correct operation for this particular input, as was pointed out previously, in order to obtain an odd parity. The binary number 5 contains 2 bits (ones) and an additional third bit is necessary to produce the odd number three for an odd parity.

If, as was described previously, the input number to the parity generator is incorrect i. e. above 9, the parity generator should produce an incorrect or even parity. Thus if the number inserted were 13, the $2^0$, $2^2$, or $2^3$ inputs would be energized. With these inputs "or" gate 180 will now receive in addition to the two normal inputs, an inhibit input at the anode of diode 204. The conduction through diodes 200 and 202 will prevent any change in the output of "or" gate 180 and the "or" gate will remain "high." Since the "or" gates 182, 184, and 186 do not receive any additional impulses from the $2^3$ input, the operation of these is the same as previously described. "Or" gate 188 will receive an additional normal input from the $2^3$ input. Obviously this can have no further effect upon the operation of the "or" gate and the "or" gate will remain "high." Under these conditions when a clock pulse is received, "and" gate 190 will produce an output parity pulse. Since the number 13 already contains three ones the addition of the parity pulse produces an even number of ones, which is an even or incorrect parity for the system herein intended an error can thus be readily detected. This incorrect parity will be indicated when the parity of this number is checked.

It is desirable to adjust the clock pulse generator to provide a clock pulse of shorter time duration than the input pulses and to fall exactly in the center thereof. For example, the $2^0$ to $2^3$ input pulses inclusive, may be of three microseconds duration and the clock pulse input of one microsecond duration. After the input pulses have been applied one microsecond, the clock pulse generator can be gated on for the one microsecond and then gated off while the number representing inputs remain on for an additional microsecond. Apparatus for this type of operation is known in the art. The shortened clock pulses are used to ensure that no spurious outputs occur. If the clock pulses were on for the same time duration as the remaining input pulses to the "or" gates, transient outputs might occur.

By way of summary, pulses representing a digit of a number in a binary coded decimal representation from a converter are applied to the $2^0$ to $2^3$ inputs inclusive, of the parity generator. All of these inputs along with a clock pulse input are connected to input amplifiers. The input amplifiers receiving the input pulses from the several inputs produce positive or negative outputs in their secondary winding outputs. The clock pulse amplifier has a single secondary winding output and produces a positive pulse when energized. Through distribution lines 80 to 95 inclusive, these pulses in the secondary windings are transmitted to certain of the "or" gates. On the presence or absence of the proper pulses the several "or" gates will assume a "high" or "low" condition. If the outputs of all of the "or" gates are "high" on the receipt of a clock pulse "and" gate 190 will produce a parity pulse output. This parity pulse is either added in with the binary coded decimal representation of the decimal digit to produce an odd parity or used to prevent the addition of a parity pulse if an even parity is employed. This odd parity must be carried through the remainder of any computing system and if any individual binary bit is (lost) a later parity check can detect the error. Further for numbers above nine an incorrect parity will be generated. The addition of the parity pulse to the remaining pulses presents no problem since the time required for the parity generators shown herein to operate is on the order of ½ microsecond. The code pulses may be delayed for this time to permit the operation of the generator, or if as is usually the case, the code pulses are subsequently either stored or statisciized. The subsequent operation of the storage or staticizing device may be delayed long enough for the addition of the parity pulse.

There has been shown and described hereinabove a novel system requiring a minimum amount of apparatus for obtaining a relatively fast operating, inexpensive and efficient parity generator whose construction, operation and maintenance is relatively simple. Further the parity generator will produce an incorrect parity pulse if the number inserted is too "high." The parity generator functions to provide an output pulse having an excellent wave shape, prevents the occurrence of spurious outputs, and does not require that the binary sum be staticized for counting purposes so that the parity requirement may be determined.

What is claimed is:

1. In apparatus for selectively generating a parity pulse for a number represented in a binary code, the combination of a plurality of parallel signal input channels each of which corresponds to a different one of the binary digits of said number, means to apply electrical signals to said signal input channels to establish them in conditions representative of said number, means responsive to each of said signals on said signal input channels to generate phase and paraphase voltages, a single signal output channel, a plurality of gate circuit means connected to said signal output channel, said plurality of gate circuit means being responsive to various predetermined combinations of said phase and paraphase voltages to produce a parity signal on said signal output channel, and distribution network means to distribute said phase and paraphase voltages in said predetermined combinations to said plurality of gate circuit means to operate said gate circuit means to provide a parity signal in said signal output channel.

2. Apparatus for selectively generating a parity pulse for a number represented in a binary code comprising a plurality of parallel signal input channels, each of which correspond to a different one of the binary digits of said number, means to apply electrical signals to said input channels representative of said number, a means for each of said channels responsive to the presence of a signal to generate phase and paraphase voltages, a plurality of first gate circuits, a second gate circuit connected to the output from each of said plurality of first gates, and means to apply in accordance with parity requirements said phase and paraphase voltages to each of said first gate circuits in predetermined combinations to operate said first gates and said second gate responsive thereto to provide a parity pulse.

3. Apparatus for selectively generating a parity pulse for a number represented in a binary code comprising a plurality of parallel signal input channels, each of which corresponds to a different one of the binary digits of said number, means to apply electrical signals to said input channels representative of said number, a means for each of said channels responsive to the presence of a signal to generate phase and paraphase voltages, a source of time spaced clock pulses, a plurality of first gate circuits each of which is adapted to be operative responsive to the application one of said clock pulses and a different predetermined combination in accordance with parity requirements of said phase and paraphase voltages, a second gate circuit adapted to be operative responsive to the operation of any one of said first gate circuits, and means to distribute pulses from said clock pulse source and outputs from said means to generate phase and paraphase voltages to each of said first gate circuits in accordance with said predetermined different combinations.

4. Apparatus for selectively generating a parity pulse for a number represented in a binary code comprising a plurality of parallel signal input channels, each of which corresponds to a different one of the binary digits of said number, means to apply electrical signals to said input channels representative of said number, a means for each of said channels responsive to the presence of a signal to generate phase and paraphase voltages, a source of time spaced clock pulses, a plurality of first gate circuits each of which is adapted to be operative responsive to the application in accordance with parity requirements of a different predetermined combination of said phase and paraphase voltages, a second gate circuit adapted to be operative responsive to an output from all of said first gates together with one of said clock pulses, and means to distribute outputs from said means to generate phase and paraphase voltages to each of said first gate circuits in accordance with said predetermined different combinations.

5. Apparatus of the type described in claim 3 wherein said plurality of signal input channels comprises four separate channels, said plurality of gate circuits comprises five separate gate circuits, and characterized further in that the first of said separate gate circuits is responsive to said phase voltages from only the first and fourth of said separate channels and said clock pulse in the absence of said paraphase voltages from the second and third of said separate channels to produce a parity signal on said signal output channel, the second of said separate gate circuits is responsive to said phase voltages from only the second and third of said separate channels and said clock pulse in the absence of said paraphase voltage from the first of said separate channels to produce a parity signal on said signal output channel, the third of said separate gate circuits is responsive to said phase voltages from only the first and third of said separate channels and said clock pulse in the absence of said paraphase voltage from the second of said separate channels to produce a parity signal on said signal output channel, the fourth of said separate gate circuits is responsive to said phase voltages from only the first and second of said separate channels and said clock pulse source in the absence of said paraphase voltage from the third of said separate channels to produce a parity signal on said signal output channel, and the fifth of said separate gate circuit means is responsive to said clock pulse voltage in the absence of said paraphase voltages from said first, second, third and fourth of said separate channels to produce a correct parity signal on said signal output channel whereby a correct parity signal is generated for numbers between zero and nine and an incorrect parity signal is produced on said signal output channel for numbers above nine.

6. Apparatus of the type described in claim 4 wherein said plurality of signal input channels comprises four separate inputs, said plurality of first gate circuits comprises five separate sensing gate circuits, and said second gate circuit includes a coicidence gate circuit connected to the outputs of said five separate sensing gate circuits, said second gate circuit providing a parity signal only when the absolute count of said signals on said signal input channels is an even number.

7. Apparatus of the type described in claim 3 wherein said plurality of signal input channels comprises four separate channels, said plurality of first gate circuits comprises five separate coincidence gate circuits, and said second gate circuit including a sensing gate circuit connected to the outputs of said five separate coincidence gate circuits, said sensing gate circuit providing a parity signal only when the absolute count of said signals on said signal input channels is an even number.

8. Apparatus of the type described in claim 4 wherein said plurality of signal input channels comprises four separate channels, said plurality of first gate circuits comprises five separate sensing gate circuits, and said second gate circuit includes a coincidence gate circuit, and wherein the first of said sensing gate circuits is responsive to said phase voltages from the first and third in the absence of said paraphase voltage from the fourth of said separate channels to pass a voltage to said coincidence gate circuit, the second of said sensing gate circuits is responsive to said phase voltages from the first and third in the absence of said paraphase voltage from the second of said separate channels to pass a voltage to said coincidence gate circuit, the third of said plurality of sensing gate circuits is responsive to said phase voltages from the first and second in the absence of said paraphase voltage from the third of said separate channels to pass a voltage to said coincidence gate circuit, the fourth of said sensing gate circuits is adapted to pass a signal to said coincidence gate circuit in the absence of said paraphase voltages from the first, second and third of said separate channels, the fifth of said plurality of sensing gate circuits is responsive to said phase voltages from the second, third and fourth in the absence of said paraphase voltage from the first of said separate channels to pass said signal to said coincidence gate circuit, said coincidence gate circuit being adapted to generate said parity signal only when said signals from all five of said separate sensing gate circuits are present.

References Cited in the file of this patent

UNITED STATES PATENTS

| Number | Name | Date |
|---|---|---|
| 2,484,226 | Holden | Oct. 11, 1949 |
| 2,512,038 | Potts | June 20, 1950 |
| 2,564,403 | May | Aug. 14, 1951 |